(12) United States Patent
Deo et al.

(10) Patent No.: US 12,038,912 B2
(45) Date of Patent: Jul. 16, 2024

(54) TRANSACTION MANAGER LIBRARY FOR AUTOMATIC ENLISTING OF DISTRIBUTED XA PARTICIPANTS

(71) Applicant: Oracle International Corporation, Redwood Shores, CA (US)

(72) Inventors: Brijesh Kumar Deo, Fairfield, CA (US); Mukul Gundawar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 17/966,461

(22) Filed: Oct. 14, 2022

(65) Prior Publication Data

US 2024/0126742 A1 Apr. 18, 2024

(51) Int. Cl.
 *G06F 16/20* (2019.01)
 *G06F 16/23* (2019.01)

(52) U.S. Cl.
 CPC ................................ *G06F 16/2379* (2019.01)

(58) Field of Classification Search
 CPC .................................................. G06F 16/2379
 See application file for complete search history.

(56) References Cited

U.S. PATENT DOCUMENTS

| | | | |
|---|---|---|---|
| 2005/0125445 A1* | 6/2005 | Cotner | G06F 16/2365 |
| 2005/0262182 A1* | 11/2005 | Thole | G06F 9/466 |
| | | | 709/200 |
| 2011/0185360 A1 | 7/2011 | Mitchell et al. | |
| 2013/0151889 A1* | 6/2013 | Markus | G06F 16/22 |
| | | | 707/703 |
| 2013/0268503 A1 | 10/2013 | Budithi et al. | |
| 2015/0082326 A1 | 3/2015 | Milliron et al. | |
| 2015/0309889 A1* | 10/2015 | Campbell | G06F 9/466 |
| | | | 714/16 |
| 2016/0092318 A1 | 3/2016 | Ananthapadmanabh et al. | |
| 2016/0294726 A1* | 10/2016 | Parkinson | G06F 16/2365 |
| 2017/0048339 A1 | 2/2017 | Straub | |
| 2017/0220621 A1* | 8/2017 | Colrain | G06F 11/0745 |
| 2018/0137210 A1 | 5/2018 | Bensberg et al. | |
| 2020/0272620 A1* | 8/2020 | Zhang | G06F 16/2379 |
| 2023/0224376 A1* | 7/2023 | Little | H04L 67/562 |
| | | | 709/230 |

FOREIGN PATENT DOCUMENTS

CN 115934260 A * 4/2023

OTHER PUBLICATIONS

Article entitled "XA and Oracle Controlled Distributed Transactions", by Oracle, dated Jun. 2010 (Year: 2010).*

(Continued)

*Primary Examiner* — Mahesh H Dwivedi
(74) *Attorney, Agent, or Firm* — Vista IP Law Group, LLP

(57) ABSTRACT

Disclosed is an improved approach to integrate distributed applications into an XA transaction. A transaction manager library is integrated into a distributed application, where the transaction manager library provides the benefit of implementing optimizations for the XA transaction, as well as minimizing or eliminating the need to create custom software code to make the application operable with the transaction manager for the XA transaction.

24 Claims, 10 Drawing Sheets

(56) References Cited

OTHER PUBLICATIONS

Article entitled "Oracle Transaction Manager for Microservices", by Goel et al., dated May 27, 2022 (Year: 2022).*
Non-Final Office Action for U.S. Appl. No. 17/647,447 dated Feb. 17, 2023.
"Reliability through Atomicity," Atomikos, Copyright 2021.
"XA and Oracle controlled Distributed Transactions," Oracle White Paper, Jun. 2010.
Janakiram, "Google's gRPC: A Lean and Mean Communication Protocol for Microservices," The New Stack, Sep. 9, 2016.
"Introduction to gRPC," dated Dec. 16, 2020.
"Jakarta Transactions," Jakarta Foundation, Page Captured May 21, 2021.
"Java™ Transaction API (JTA): Version 1.3," Oracle, released Mar. 2018.
"Narayana Homepage: Welcome to the Narayana community!," Narayana, Page Captured on May 21, 2021.
"Distributed Transaction Processing: The TX (Transaction Demarcation) Specification," The Open Group, dated Apr. 1995.
"Distributed Transaction Processing: The XA Specification," The Open Group, dated Dec. 1991.
"Fusion Middleware Programming Resource Adapters for Oracle Weblogic Server," Oracle Webserver, copyright 2021.
"XA Transactions," Weblogic Server Components, Oracle, Copyright 2010.
Final Office Action for U.S. Appl. No. 17/647,447 dated Jun. 26, 2023.
Non-Final Office Action for U.S. Appl. No. 17/647,447 dated Oct. 16, 2023.
Final Office Action for U.S. Appl. No. 17/647,447 dated Jan. 31, 2024.

\* cited by examiner

```
UserTransaction ut = new TrmUserTransaction();
ut.begin();
//Perform Business Logic by Calling other services
if (all calls to other services are successful)
    ut.commit();
else
    ut.rollback();
```

```
//Example for a participant using Oracle
database:
XADataSource dataSource = new
jdbc.xa.client.XADataSource();
dataSource.setURL(url); //connection
string
dataSource.setUser(user);
dataSource.setPassword(password);
TrmConfig.initXaDataSource((XADataSource)
dataSource);
```

Fig. 4

```
//Bank A - Helidon-MP (XA Participant 1)
@Path("/")
@RequestScoped
public class WithdrawResource {
    @Inject @TrmSQLConnection private Connection connection; //The Connection object
injected by the TMM library in the application code.

@POST
    @Path("/withdraw")
    @Consumes(MediaType.APPLICATION_JSON)
    @Produces(MediaType.APPLICATION_JSON)
    public Response withdraw() {
        try {
            String query = "update ledger set value=value-10 where account='a'";
            Statement stmt = connection.createStatement(); //Use the Connection
object injected by the TMM library
            stmt.execute(query);
            stmt.close();
            connection.close();

return Response.ok().build();
        } catch (SQLException e) {
            e.printStackTrace();
            System.out.println(e.getMessage());
            return Response.status(Response.Status.INTERNAL_SERVER_ERROR).entity(e.getMessage()).build();
        }
    }
}
```

Fig. 5

TRANSACTION MANAGER LIBRARY FOR AUTOMATIC ENLISTING OF DISTRIBUTED XA PARTICIPANTS

BACKGROUND

Various open standards have been promulgated for the implementation, management, and coordination of transactions across multiple distributed resources. For example, the XA Architecture ("eXtended Architecture") is a widely used standard released in 1991 by the X/Open consortium for handling distributed transaction processing.

XA describes the interface that is used between various entities within the XA architecture, such as an application, a transaction manager, and a resource manager. In a typical distributed transaction processing (DTP) environment as described by X/Open, the transaction manager (TM) is used to coordinate transactions that span multiple resource managers (RM), e.g., distributed database databases.

Historical implementations of the XA architecture tended to focus on a monolithic software architecture, where the use of the X/Open XA specification pertained to the interfaces between the TM and the RM with an assumption of a direct connection from the TM to the RM. The basis of this assumption is that in a monolithic software design, these two entities are both components integrated within a single larger software product. However, in a modern service oriented architecture (SOA) model, it is possible that the TM and RM entities are no longer bundled together within a single monolithic software product, but are instead separated into entities that are distinct from one another, e.g., as separate services or microservices. An example approach to implement a TM entity that is distinct from the RM entity is disclosed in U.S. application Ser. No. 17/647,447, which is hereby incorporated by reference in its entirety.

Applications and other entities that take part in an XA transaction will generally need the ability to communicate with the TM. To be able to interact with the TM for XA processing, an application will need to include specific programming and software code that has an in-depth understanding of the wire protocols and transaction APIs supported by the TM. However, consider if an application needs to have its codebase undergo customized programming and code development to make this happen, which could incur a significant amount of effort, cost, and the need for highly specialized software personnel. This approach would be problematic if it needs to occur for every single application that seeks to take part in the XA transaction managed by the TM. In other words, if there are thousands of applications that may be part of the XA transaction, then each and every one of those thousands of applications would require a programmer with low-level understanding of the details of the TM to write software to modify the application to be able to work with the TM. This could place a huge burden on the participant applications to implement the required functionality for participating in the XA transaction with the TM, creates the high risk that errors may be inadvertently introduced by individual programmers for certain of the applications, create inconsistent implementations across the applications, cause significant amounts of redundant work and effort, and reduce demand for adoption of the XA technology or use of transaction managers.

Therefore, there is a need for an improved approach for implementing the XA architecture that addresses the above-described problems.

SUMMARY

Embodiments of the invention are directed to an improved approach to integrate distributed applications into an XA transaction. According to some embodiments, a transaction manager library is integrated into a distributed application, where the transaction manager library provides the benefit of implementing optimizations for the XA transaction, as well as minimizing or eliminating the need to create custom software code to make the application operable with the transaction manager for the XA transaction.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF TIE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1 provides an illustration of a system for implementing some embodiments of the invention.

FIG. 2 shows a flowchart of an approach to implement some embodiments of the invention.

FIGS. 3-5 provide illustrative examples of pseudocode for some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the invention are directed to an improved approach to integrate distributed applications into an XA transaction. According to some embodiments, a transaction manager library is integrated into a distributed application, where the transaction manager library provides the benefit of implementing optimizations for the XA transaction, as well as minimizing or eliminating the need to create custom software code to make the application operable with the transaction manager for the XA transaction.

Figure 1:
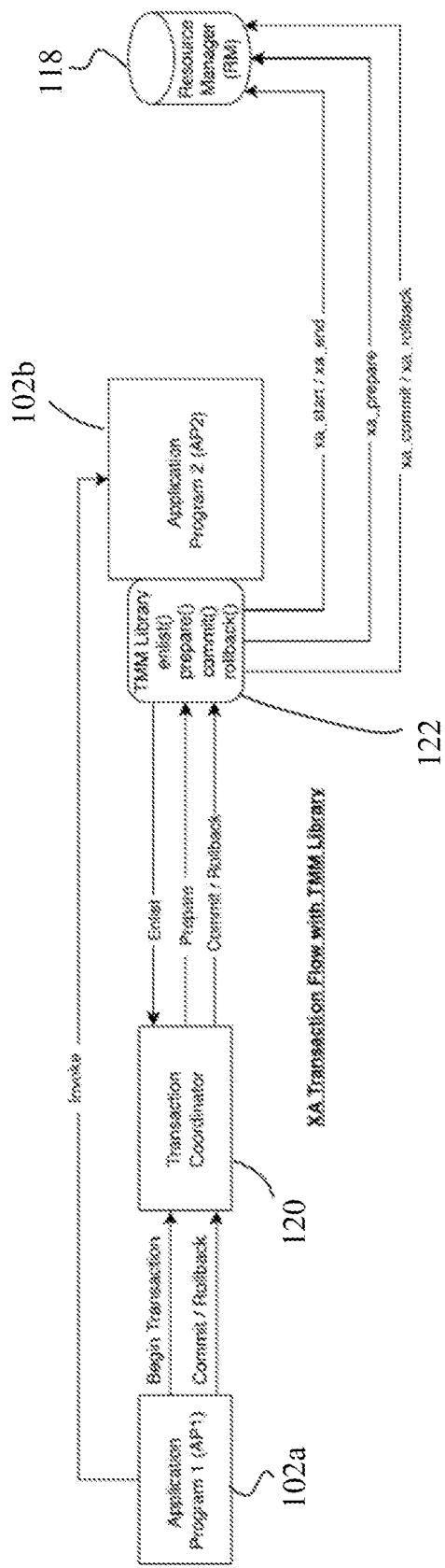

FIG. 1 provides an illustration of a system for implementing some embodiments of the invention. The system includes one or more resource managers (RMs) 118. A RM manages a resource that is used by and/or accessible to a given application program AP. Any entity (e.g., a software entity or a client) can request access to the resource using a service provided by the RM. For instance, the RM may be embodied as a database management system (DBMS), a cache system, a messaging system, and/or any other type of resource that may be usefully accessed by an application program. In the database context, the RM controls a shared, recoverable resource that can be returned to a consistent state after a failure. Examples are relational databases, transactional queues, and transactional file systems.

An AP corresponds to an application program that engages in processing activity with respect to one or more RMs. The AP is operated with respect to transactions and will access resources within transaction boundaries for those transaction. Each AP specifies a sequence of operations that involves resources such as a database, where the database corresponds to a given RM.

The AP may be implemented within any suitable architecture model. For example, the AP may be implemented in a cloud infrastructure, such as the Oracle Cloud Infrastructure provided by Oracle Corporation. In a cloud computing environment, computing systems may be provided as a service to customers. One of the main reasons for the rising popularity of cloud computing is that the cloud computing model typically allows customers to avoid or minimize both the upfront costs, as well as ongoing costs, associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time. The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

A plurality of APs 102a and 102b may be used, where each AP corresponds to a different application program that may run on a computing node. Each computing node within the cloud infrastructure may correspond to any type of computing device that may be used to implement, operate, or interface with the system. Examples of such devices include, for example, workstations, personal computers, mobile devices, servers, hosts, nodes, or remote computing terminals. The computing node may include or be otherwise communicatively associated with a display device, such as a display monitor, for displaying a user interface to users. One or more input devices may be provided for the user to provide operational control over the activities of the system or AP, such as a mouse or keyboard to manipulate a pointing object in a graphical user interface to generate user inputs. The computing nodes may be associated with cloud storage mechanisms, cloud communications, a cloud operating system (OS) (or bare metal virtualization), and/or cloud processing resources. The APs may also exist outside of the cloud computing context. For example, an AP may be located in an external environment to the cloud infrastructure, where the external environment corresponds any type of non-cloud location that may host an AP, such as for example, an on-premises computing system or data center.

The transaction manager 120 (which may also be referred to herein as either the TM or "transaction coordinator") is an entity that manages and coordinates global transactions, providing the processing to coordinate the decision to commit the transactions or to roll them back. The TM may also operate to coordinate the recovery process in the event of a failure.

Various implementations of the XA architecture may be used in conjunction with embodiments of the invention. For example, with the broad acceptance of the service-oriented architecture (SOA) in the software industry, the AP, TM, and/or RM components may be implemented as distinct and separate services or microservices instead of being implemented as components of a single common system. Each service in an SOA embodies the components necessary to execute a discrete and defined function within the system. A microservice is a variant of the SOA concept, where the microservice is considered as a finer-grained implementation of a service. Services are typically exposed using standard network protocols such as SOAP (simple object access protocol) or REST (Representational State Transfer), where these protocols are used to send requests to read or change data. In the XA context, if the TM is implemented as a service or microservice, the protocol conforms to the XA standard as the interface for calling the TM. Any of the APs, RMs, and/or TMs may be implemented as a service or microservice according to embodiments of the invention. For purposes of explanation, some of the current disclosure maybe described in the specific context of microservices, but it is noted that the described techniques may also be applied to services as well.

The APs, RMs, and TMs may cooperate using the XA standard to perform transaction processing. A transaction is a complete unit of work where all of the operations of the transaction must be atomically performed, i.e., the transaction's operations must all be performed or none of them can be performed. The transaction's operations may include a plurality of computational tasks, such as for example data retrieval and communications. A typical transaction initiated by an AP modifies shared resources, such as the data within one or more databases managed by one or more RMs. A "commit" occurs when a decision is made to make the operations and changes of the transaction permanent. Transactions must be also able to be rolled back. For example, in the database context, the database managed by an RM may include database-related logs such as redo and undo logs to rollback a transaction. Transactions can be rolled back if a failure occurs, if a user provides an instruction to perform a rollback, and/or if a component of the system fails, keeping it from retrieving, communicating, or storing data. Every software component subject to transaction control in the XA system must be able to undo its work in a transaction that is rolled back. When the system determines that a transaction is ready to be completed, then it commits the transaction. This means that changes to shared resources take permanent effect. Either commitment or rollback results in a consistent state.

The XA architecture is often used in the context of a distributed architecture, where work performed by a single transaction may occur across multiple RMs. This has several important implications, such as the fact that the system should have a way to refer to a transaction that encompasses work done throughout the distributed system, and the decisions made to commit or rollback the transaction must be done in a coordinated and uniform way across all of the affected RMs. Another common use case for the XA architecture is where multiple APs access a single RM. XA is required in this case because most RMs only allow a single connection to access a local transaction. By making the transaction distributed, e.g., an XA transaction, the transaction context can be provided to the other APs such that they all share a common GTRID (Global Transaction Identifier), yet access the RM through separate connections.

In operation, the AP defines the start and end of a global transaction by calling a TM. The TM assigns an identifier to the global transaction, where the TM manages global transactions and informs each RM of the identified transaction on behalf of which the RM is doing work. Although RMs can manage their own recoverable work units as they see fit, each RM must accept the transaction IDs and associate them with those work units. In this way, an RM knows what recoverable work units to complete when the TM completes a global transaction.

As is clear from this description, APs that take part in an XA transaction will need the ability to communicate with the TM. As previously noted, a non-optimal approach to configure the AP to be able to communicate with the TM is to create customized software code to modify the AP to include specific programming and software code that has an in-depth understanding of the wire protocols and transaction APIs supported by the TM. This non-optimal approach could require the customized code to be created for every application that seeks to take part in the XA transaction managed by the TM. The obvious problem with this approach is that it places a huge burden on the participant applications to implement the required functionality for participating in the XA transaction with the TM, creates the high risk that errors may be inadvertently introduced by individual programmers for certain of the applications, create inconsistent implementations across the applications, and cause significant amounts of redundant work and effort.

Embodiments of the invention solve these problems by providing a transaction manager library 122 (also referred to herein as a transaction manager microservices or "TMM" library), which is integrated into an AP 102b. The TMM library 122 is integrated with the AP 102b, and is operable to enlist the AP 102b as a participant and registers a set of callback functions with the TM 120 within an XA Transaction. This enlisting would occur automatically and is transparent to the application code. The TMM Library 122 creates a connection with and starts a distributed transaction with the RM 118 being used by the AP 102b in a transparent manner and injects the Resource Manager connection into the application code for the application to make use of it.

Without the TMM Library, an application must provide its own implementation of the callback functions for enlist, prepare, commit and rollback. This requires having to know the wire protocol and the request-response semantics being used to communicate with the Transaction Coordinator. Also, the application would have to manage the interaction (transaction) with the Resource Manager (RM) which requires the understanding of the XA Protocol and the RM driver that would be used to communicate with the RM. This adds a significant burden on the application that would participate in an XA Transaction managed by the Transaction Manager, and could become significant hurdles for the adoption of any such TMs.

With the TMM Library 122, an application does not itself have to provide the implementation of the callback functions for enlist, prepare, commit and rollback. Instead, these callback functions are implemented within the TMM Library. This removes the burden from applications from having to know the wire protocol and the request-response semantics being used to communicate with the TM 120. Also, the application would not have to manage the interaction (transaction) with the Resource Manager (RM) which requires the understanding of the XA Protocol and the RM driver that would be used to communicate with the RM. The TMM Library removes a significant burden on the application that wants to participate in an XA Transaction managed by the TM 120.

Figure 2:
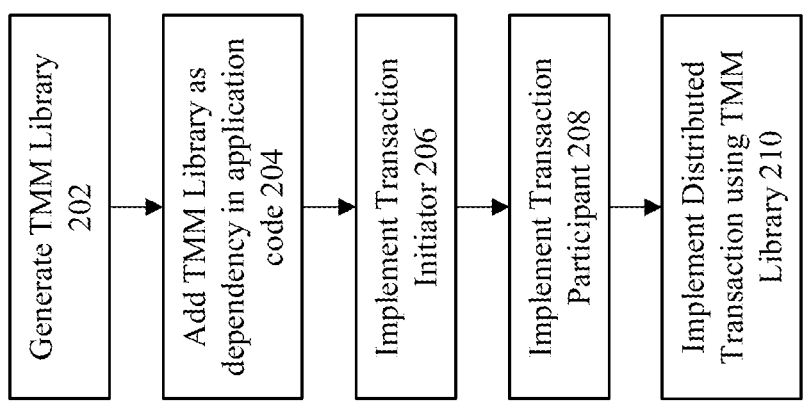

FIG. 2 shows a flowchart of an approach to implement some embodiments of the invention. During a setup phase at step 202, a TMM library is created and configured. In general, the TMM Library may be implemented as a set of classes and functions that can be integrated into an application code for implementing an XA transaction. In some embodiments, the TMM library may be implemented as a set of callback REST functions for XA transaction coordination functionality. A non-exclusive list of such functions that may be incorporated into the library includes functions such as prepare, commit, rollback, and/or a method to enlist and register these callbacks with the Transaction Manager.

In some embodiments, for the library that is used in the AP to interact with a TM, the library conforms to the X/Open distributed transaction processing (DTP) XA interface specification. The X/Open DTP architecture defines a standard architecture or interface for XA that, as previously noted, allows multiple application programs to share resources provided by multiple, and possibly different, resource managers. This mechanism also coordinates the work between application programs and resource managers into global transactions.

For example, the library interface may be used to implement the two-phase commit protocol, consisting of a prepare phase and a commit phase, to commit transactions. In phase one, the prepare phase, the TM asks each RM to guarantee the ability to commit any part of the transaction. If this is possible, then the RM records its prepared state and replies affirmatively to the TM. If it is not possible, then the RM may roll back any work, reply negatively to the TM, and forget any knowledge about the transaction. The protocol allows the application, or any RM, to cause the rollback of the transaction unilaterally until the prepare phase is complete. In phase two, the commit phase, the TM records the commit decision. Then the TM issues a commit or rollback to all RMs which are participating in the transaction.

The library may include any interface routines as appropriate, such as one or more of the following: (a) "xa_open", which is used to connect to the resource manager; (b) "xa_close", which is used to disconnect from the resource manager; (c) "xa_start", which is used to start a new transaction and associate it with the given transaction ID (XID), or associate with an existing transaction; (d) "xa_end", which is used to disassociate from the given XID; (e) "xa_rollback", which is used to rollback the transaction associated with the given XID; (f) "xa_prepare", which is used to prepare the transaction associated with the given XID, and is the first phase of the two-phase commit protocol; (g) "xa_commit", which is used to commit the transaction associated with the given XID, and is the second phase of the two-phase commit protocol; (h) "xa_recover", which is used to retrieve a list of prepared, heuristically committed or heuristically rolled back transaction; and/or (i) "xa_forget", which is used to forget the heuristic transaction associated with the given XID.

In some embodiments of the invention, additional extensions for the XA library are used to implement a proxying mechanism. For example, using the library to perform a distributed transaction will create a URI (e.g., a URL) that is associated with the AP, where the URI provides a callback path to the AP from the TM. In effect, the TM can use the URI to call back to the AP for TM to RM communication, which allows the TM to use the AP as an AP endpoint to access the RMs. This URI could be associated with the same AP associated with the transaction, or to any AP that can handle proxy requests from the TM to the RM. This additional information can be carried out-of-band in headers, or by extending the existing APIs to pass along this additional URI. It is noted that this aspect of the invention may be illustratively explained in this disclosure with respect to the creation of a URL that is associated with the AP, with the understanding that the invention is not limited to URLs and indeed may be implemented using any suitable URI.

During an operational/execution stage, the AP performs transaction-related operations that require the AP to open a connection to the RM. For example, within the X/Open DTP model, the AP may communicate to the RM using the RM's native interface (e.g. SQL) for implementing data manipulation language (DML) operations. This is in contrast to the communications between the AP and the TM, where the AP communicates to the TM using the "TX" protocol to demarcate transaction boundaries. TX refers to an interface specification by which an AP calls to a TM to demarcate a global transaction and to direct completion of the transaction. For example, when the AP calls the TX-based operation "tx_begin( )", the TM operates to inform the participating RMs of the start of a global transaction. After each request is completed, the TM provides a return value to the AP reporting back the success or otherwise of the TX call. This TX interface used for AP-TM interaction is in contrast to the above-described XA interface which is used for TM-RM interactions, which allows the TM to structure the work of RMs into global transactions and coordinate completion or recovery. The XA interface is the bidirectional interface between the TM and RM.

At step 204, the TMM Library is incorporated into the AP. In one embodiment, this step is implemented by adding the TMM library as a dependency in the application code. For example, for application code in Java, this can be implemented by adding the TMM Library jar as a dependency in the application pom.xml file.

Once the TMM library has been integrated with the application code, then any necessary or desirable configurations may be provided for the TMM library. For example, such configurations may be either added in a properties file or via environment variables. In some embodiments, environmental variables values will operate to override the values set in the properties file.

An application can be either a transaction "initiator" or a transaction "participant." Depending on whether the application is an initiator or a participant, various steps are performed to use the TMM Library in the application code for each type of application in the transaction, such as step 206 to implement a transaction initiator and step 208 to implement a transaction participant.

With regards to step 206 for a transaction initiator, recall that a transaction initiated by an AP may modify a shared resource within one or more databases managed by one or more RMs. Therefore, an important function for the transaction initiator is to make the decision whether to commit the transaction such that the operations and changes for the transaction are made permanent, or to roll back the transaction in which case any changes made by the transaction are reverted to their pre-transaction state. In some embodiments of the invention, the operations of the initiator to perform the commit or rollback functions can be implemented by creating transaction boundaries in the application code. By way of illustration, FIG. 3 shows a Class (referred to herein as the "TrmUserTransaction" Class 302) which can used to create such transaction boundaries. As shown in this figure, the desired business logic may be performed by calling other services. If all calls to other services are successful, then a commit may be performed ("ut.commit ( )"). On the other hand, if the other calls are not successful, then a rollback may be performed ("ut.rollback( )").

With regards to step 208 for a transaction participant, the TMM library may need to be initialized for the participant application. In some embodiments, the system initializes the TMM Library by providing an instance of a XADataSource, as illustrated by the pseudocode 402 shown in FIG. 4. This performs a one-time initialization for the participant application. Several initialization activities are performed by this pseudocode. At 404, an identification is made of a database (e.g., database) for the XA transaction, so that knowledge can be made of the database that is being used for the transaction. Portion 406 identifies a connection string for connecting to the data source. Portion 408 provides credentials that can be used to connect to the data source. Portion 410 provides the data source to the TMM library.

At 210, the XA transaction is then performed by using the TMM library that has been integrated with the AP. FIG. 5 shows example pseudocode 502 that may be used in some embodiments of the invention to use the TMM Managed Database connection injected into the application code. Portion 504 is implemented to initially hand over the connection to the transaction manager. This makes the work being performed to now operate in the context of the XA transaction, and to make sure that the application uses the same connection for the work being done in the context of the same XA transaction as the rest of the applications in the same transaction. Portion 508 is used to perform the actual steps to implement the desired operations on data to further the transaction (e.g., to update a set of ledger values in a database). However, it is notable that the injected connection is used to run the query to update the ledger values, as shown in portion 506.

Therefore, what the above description provides is an approach where, when a transaction is initiated by the initiator application and a REST call is made to the API of the distributed application, the TMM library intercepts the incoming REST request using filters/interceptors and introspects the request headers to find the Transaction Manager URL to which the enlist call must be made. A REST request is sent by the TMM library to the Transaction Manager URL with the details of the callback function URLs to enlist the application as a participant in the XA transaction and to register the callbacks.

The Transaction Manager then invokes the callback REST APIs in the TMM lib on the participant side for transaction management. The TMM library interacts with the Resource Manager of the application to prepare, commit or rollback the transaction.

Another advantage provided by some embodiments of the invention is that the TMM library is capable of being used to implement additional optimizations for the processing of XA transactions.

Figure 6:
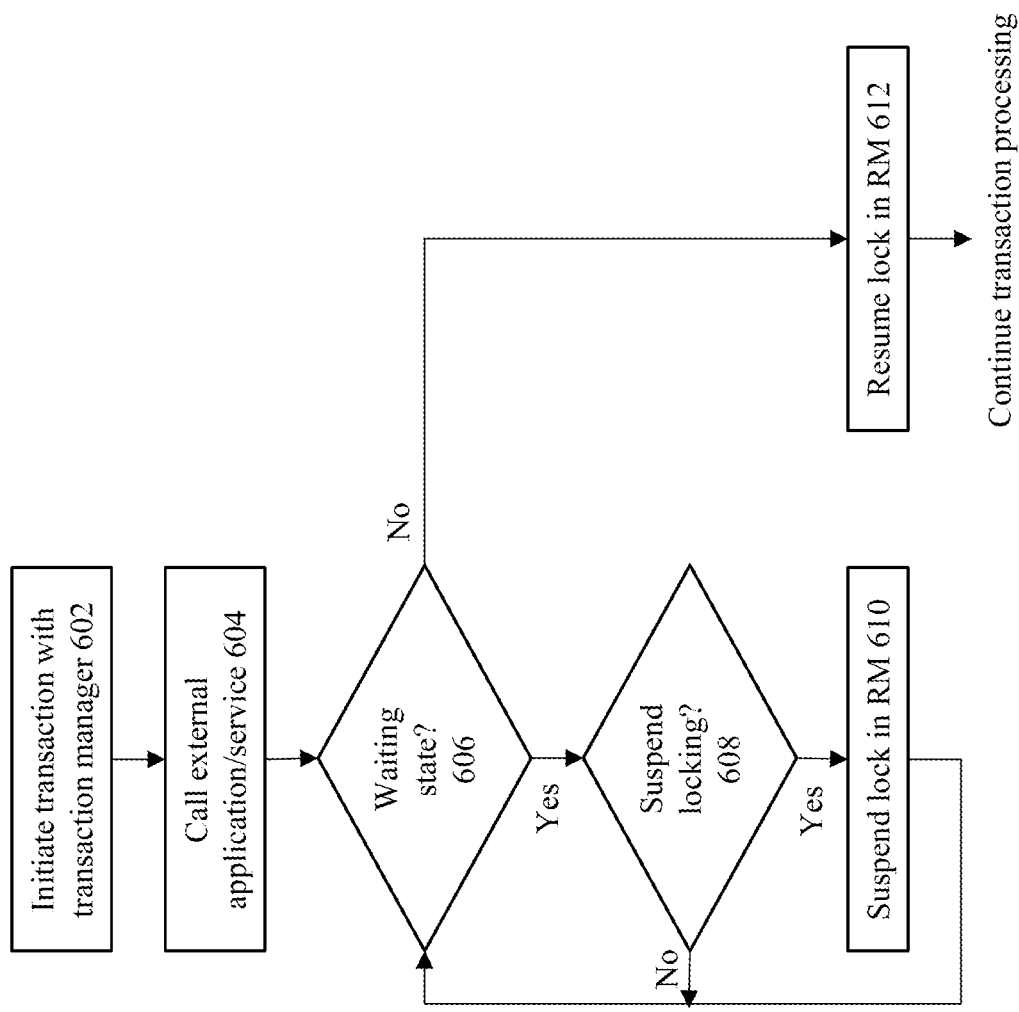
FIGS. 6-8 shows flowcharts of example approaches to implement optimizations with a TMM library.

FIG. 6 shows a flowchart of an approach to implement an optimization to implement suspension and resumption for an application. To explain, consider the situation when an application program may have to call one or more external application programs/services from within a transaction context. In such conditions, it would be advantageous to prevent any undue blocking when there may be multiple applications that access the same RM.

The process begins at 602 when a transaction is initiated that involves one or more application programs. At 604, an external application/service may be called. However, there may need to be a waiting state that occurs. For example, the waiting state may occur when there is a delay due to the activities that still need to be completed by another application involved with the XA transaction, or where the current application is in a wait state due to some sort of contention or delay at the node for the current application. Therefore, a check is made at 606 whether there is a current waiting state.

If the answer is yes that there is a current waiting state, then a determination is made at 608 whether to suspend any hold or lock placed by the application program at the RM. For example, it is possible that the transaction initiated with the Resource Manager (RM) should be suspended and resumed later when a response is later received from an earlier call to the external program/service. This is intended to avoid blocking the RM for the duration in which the application program would be communicating with an external program/service. If a determination is made that the lock needs to be suspended, then at 610, the TMM library may send an instruction to the RM to suspend the lock. In an additional iteration of the check at 606, a determination may be made that the application program is no longer in a waiting state. If this is correct, then at 612, a lock may be reacquired and the application may then resume its processing activities.

Figure 7:
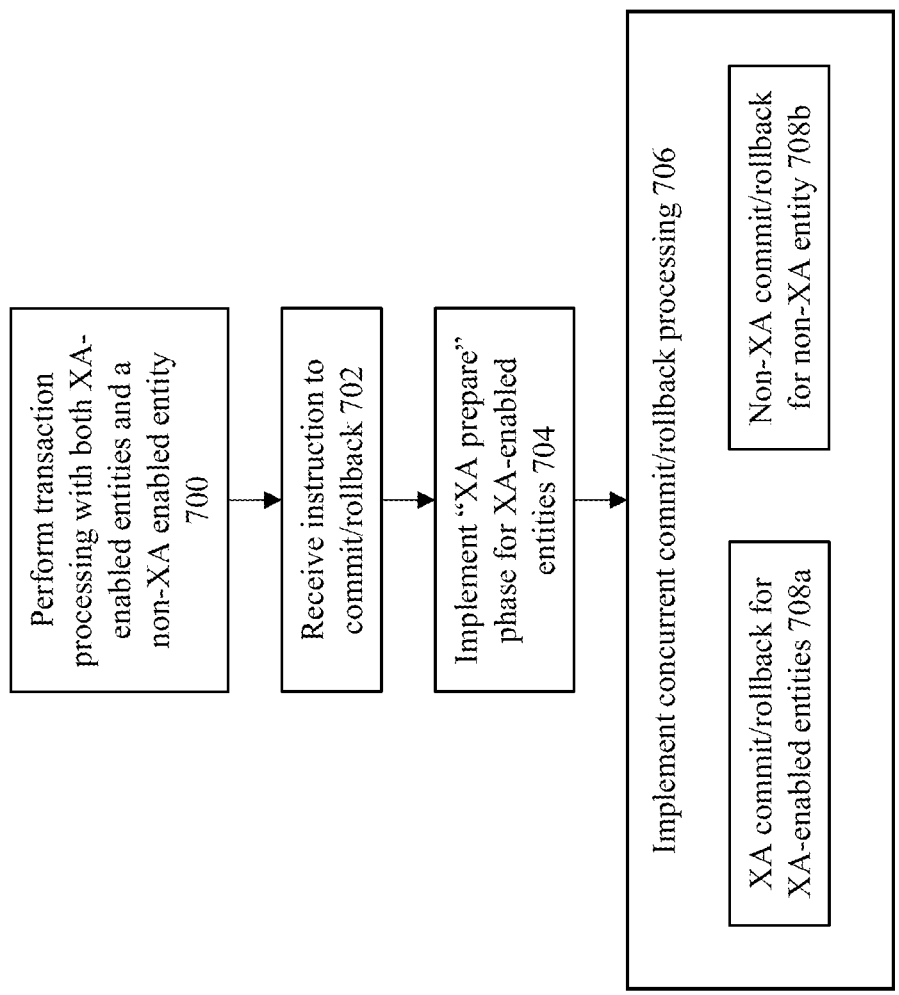

FIG. 7 shows a flowchart of an approach to implement another optimization using the TMM library, which permits a non-XA-aware application to participate in an XA transaction. Normally, all participants in an XA transaction need to be XA aware, meaning that they know how to respond to transaction coordinator requests such as prepare, commit, and rollback. However, this approach permits even a non-XA-aware entity to participate in the XA transaction.

At 700, this step begins with the transaction processing that includes both XA-enabled applications as well as a non-XA aware application. The transaction may continue for some period of time involving both sets of applications. However, at 702, an instruction is now received to either commit or rollback the transaction. At 704, the XA prepare phase is implemented for the XA-enabled applications.

At this point, at step 706, the XA processing is ready to continue with either the commit or rollback. At 808a, the TMM library will perform the processing calls necessary to implement the XA-commit/rollback for the XA-enabled application. However, a concurrent explicit call is made to implement the commit/rollback at the non-XA aware application. It is this simultaneous express call that is made to the non-aware application, done concurrently with the XA-enabled applications, which allows the non-XA aware application to safely participate in the XA transaction.

Essentially, the XA-aware entities would be coordinated for the transaction commit/rollback using the XA protocol through the TMM library, while extra non-XA calls are made to the non-XA-aware entity to coordinate any such commit or rollback. Since the coordination occurs with just a single non-XA-aware entity, the messaging approach can nonetheless make sure that an overall coordinated commit or rollback occurs for the entire transaction in a consistent manner (since all other participants are coordinated through the XA protocol). However, if there are multiple non-XA-aware entities, then this approach will no longer work, because this approach will not be able to ensure that the multiple non-XA-aware entities are guaranteed to be able to all commit or rollback in a consistent manner. This is the reason that only a single non-XA aware application may participate in the current embodiment of the invention.

Figure 8:
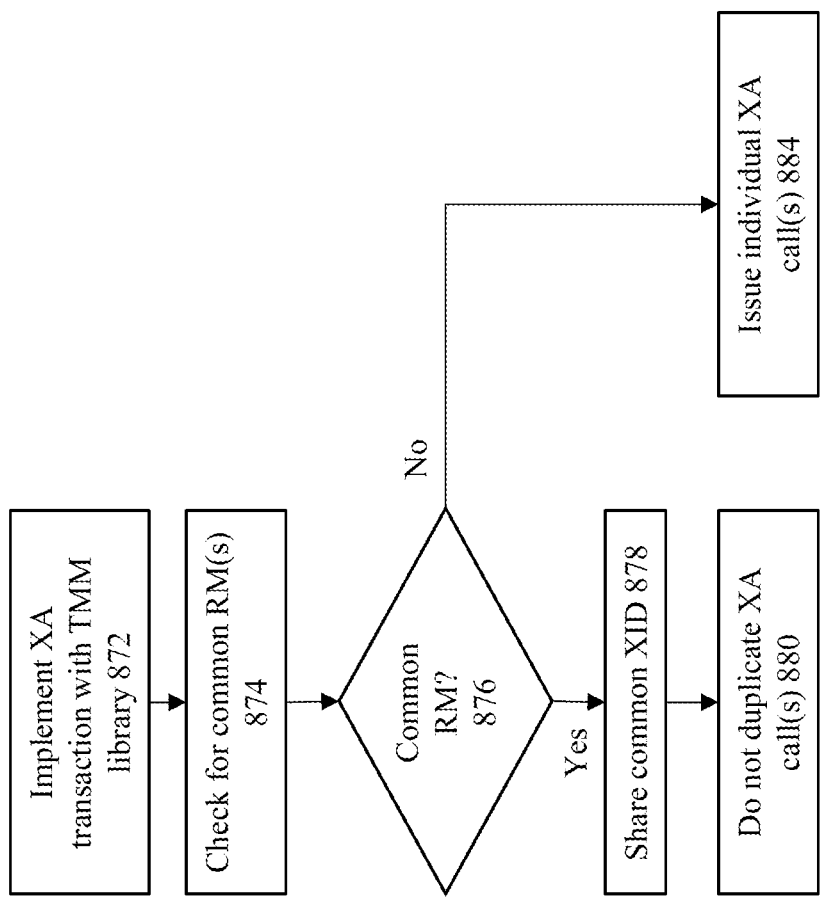

FIG. 8 shows a flowchart of yet another approach to implement an optimization using the TMM library, to support Common XID Optimization. The general context for this optimization is that it is possible for multiple participants to access the same RM (e.g., where each accesses different tables within the same database). In this situation, the TMM library can be configured to operate such that redundant XA calls are eliminated. If the transaction manager can determine that enlisting participants are accessing the same resource manager then it should be possible to share a common XID (common GTRID and common BQUAL) across those participants.

At 872, an XA transaction is implemented using the TMM library. At step 874, a check is made for a common RM between multiple applications, e.g., checking to see if there is a common GTRID. At 876, a determination may be made that there is a common RM.

When a participant enlists in a global transaction it identifies the resource manager it is using. If another participant tries to enlist in the same global transaction (same GTRID), then at 878, instead of creating a new branch qualifier, the transaction manager returns the XID used previously for that resource manager in the context of the transaction. What this means is, at 880, the same XA calls are not duplicated multiple times to the same RM by different APs. Instead of making multiple duplicative XA calls (e.g., for XA start, prepare, rollback and/or commit), only one of these calls need to be made even though there may be multiple participants for that RM. In contrast, if there is not a common RM, then at 884, individual XA calls are made by the participants to the RM(s).

This optimization is particularly valuable to users that have many microservices sharing the same database, by reducing computing and networking overhead for redundant call, and minimizing latency due to a reduced numbers of XA calls that need to be made.

Therefore, what has been described is an improved approach to integrate distributed applications into an XA transaction. The transaction manager library is integrated into a distributed application, where the transaction manager library provides the benefit of implementing optimizations for the XA transaction, as well as minimizing or eliminating the need to create custom software code to make the application operable with the transaction manager for the XA transaction.

System Architecture Overview

Figure 9:
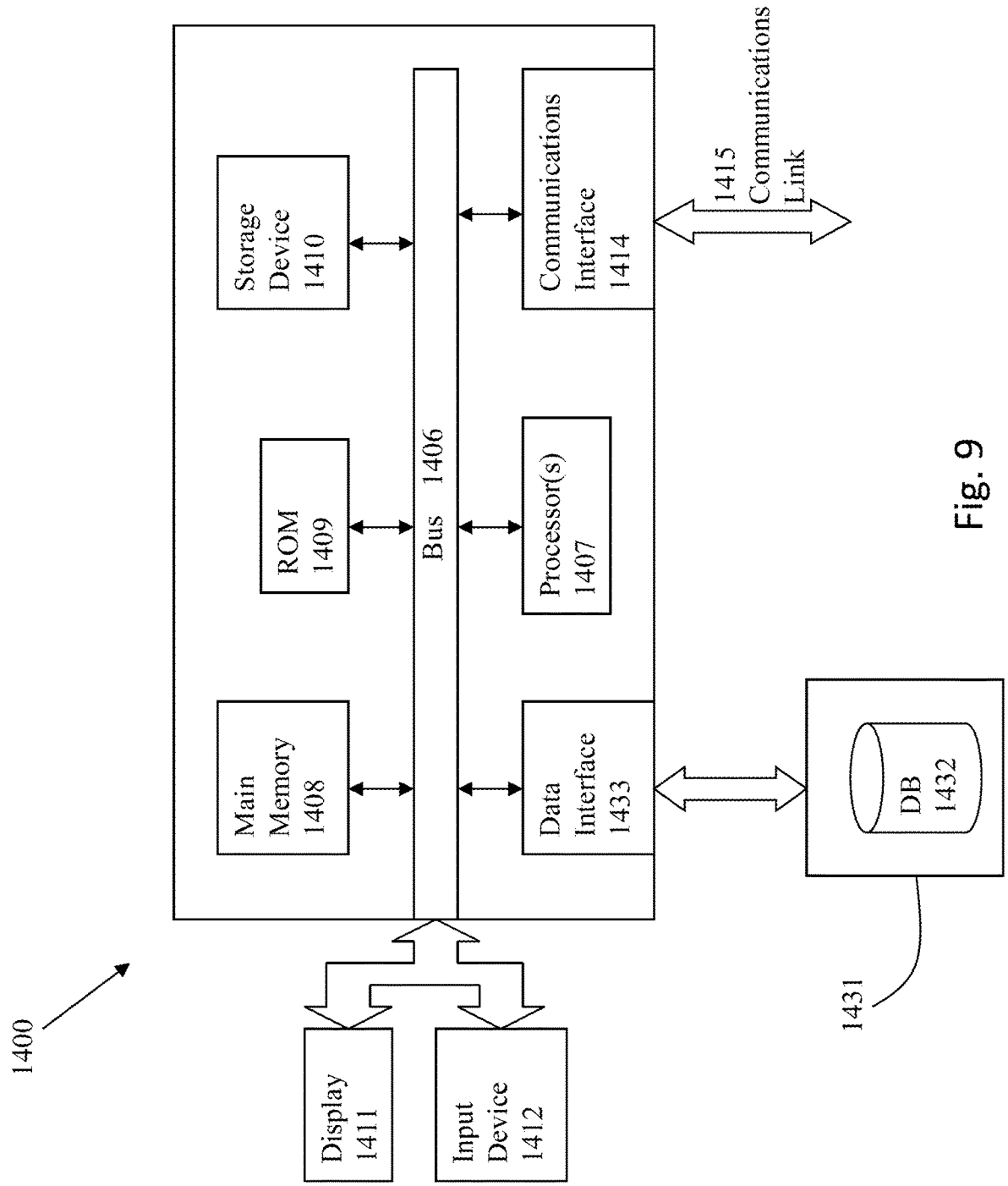
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 10:
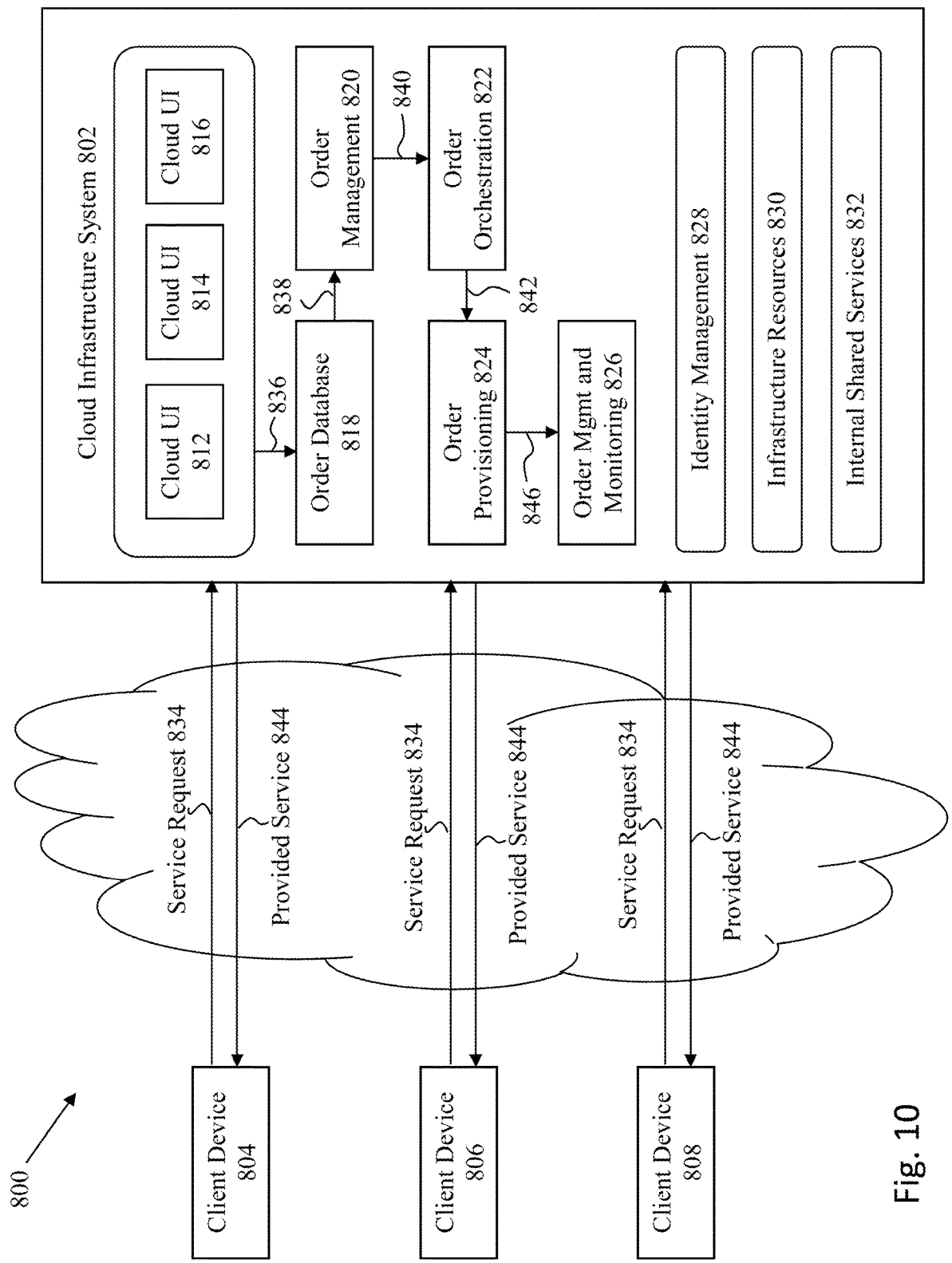
FIG. 10 is a block diagram of one or more components of a system environment in which services may be offered as cloud services, in accordance with an embodiment of the present invention.

FIG. 10 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 9. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method, comprising:
maintaining a transaction manager to implement a distributed database transaction using an XA protocol;
providing a transaction management library that is incorporated into an application program that takes part in the distributed database transaction, wherein incorporation of the transaction management library into the application program precludes a need to incorporate customized software code into the application program for communications with the transaction manager; and
implementing the distributed database transaction under the XA protocol, wherein the application program is designated as a transaction participant or transaction initiator by the transaction manager via the transaction management library that is incorporated into the application program.

2. The method of claim 1, wherein the transaction management library comprises transaction APIs (application program interfaces) supported by the transaction manager for the XA protocol.

3. The method of claim 1, wherein the transaction management library is operable to enlist the application program as the transaction participant or the transaction initiator by registering a set of callback functions with the transaction manager within the distributed database transaction, wherein the set of callback functions implements functions for enlist, prepare, commit and rollback.

4. The method of claim 1, wherein the transaction management library operates to create a connection with and starts a distributed transaction with a resource manager that is used by the application program as part of the distributed database transaction.

5. The method of claim 1, wherein the transaction management library implements a proxying mechanism for a callback path from the application program to the transaction manager.

6. The method of claim 1, wherein the transaction management library implements suspension or resumption of the application program for a waiting state.

7. The method of claim 1, wherein the transaction management library implements a call to a non-XA-aware application to participate in the distributed database transaction.

8. The method of claim 1, wherein the transaction management library implements a shared identifiers for multiple application programs that access a same resource manager.

9. A tangible computer program product embodied on a non-transitory computer readable medium, the non-transitory computer readable medium having stored thereon a sequence of instructions which, when executed by a processor causes the processor to execute actions comprising:
   maintaining a transaction manager to implement a distributed database transaction using an XA protocol;
   providing a transaction management library that is incorporated into an application program that takes part in the distributed database transaction, wherein incorporation of the transaction management library into the application program precludes a need to incorporate customized software code into the application program for communications with the transaction manager; and
   implementing the distributed database transaction under the XA protocol, wherein the application program is designated as a transaction participant or transaction initiator by the transaction manager via the transaction management library that is incorporated into the application program.

10. The computer program product of claim 9, wherein the transaction management library comprises transaction APIs (application program interfaces) supported by the transaction manager for the XA protocol.

11. The computer program product of claim 9, wherein the transaction management library is operable to enlist the application program as the transaction participant or the transaction initiator by registering a set of callback functions with the transaction manager within the distributed database transaction, wherein the set of callback functions implements functions for enlist, prepare, commit and rollback.

12. The computer program product of claim 9, wherein the transaction management library operates to create a connection with and starts a distributed transaction with a resource manager that is used by the application program as part of the distributed database transaction.

13. The computer program product of claim 9, wherein the transaction management library implements a proxying mechanism for a callback path from the application program to the transaction manager.

14. The computer program product of claim 9, wherein the transaction management library implements suspension or resumption of the application program for a waiting state.

15. The computer program product method of claim 9, wherein the transaction management library implements a call to a non-XA-aware application to participate in the distributed database transaction.

16. The computer program product of claim 9, wherein the transaction management library implements a shared identifiers for multiple application programs that access a same resource manager.

17. A computer-based system, comprising:
   a computer processor to execute a set of program code instructions;
   a memory to hold the program code instructions, in which the program code instructions comprises program code for maintaining a transaction manager to implement a distributed database transaction using an XA protocol;
   providing a transaction management library that is incorporated into an application program that takes part in the distributed database transaction, wherein incorporation of the transaction management library into the application program precludes a need to incorporate customized software code into the application program for communications with the transaction manager; and
   implementing the distributed database transaction under the XA protocol, wherein the application program is designated as a transaction participant or transaction initiator by the transaction manager via the transaction management library that is incorporated into the application program.

18. The system of claim 17, wherein the transaction management library comprises transaction APIs (application program interfaces) supported by the transaction manager for the XA protocol.

19. The system of claim 17, wherein the transaction management library is operable to enlist the application program as the transaction participant or the transaction initiator by registering a set of callback functions with the transaction manager within the distributed database transaction, wherein the set of callback functions implements functions for enlist, prepare, commit and rollback.

20. The system of claim 17, wherein the transaction management library operates to create a connection with and starts a distributed transaction with a resource manager that is used by the application program as part of the distributed database transaction.

21. The system of claim 17, wherein the transaction management library implements a proxying mechanism for a callback path from the application program to the transaction manager.

22. The system of claim 17, wherein the transaction management library implements suspension or resumption of the application program for a waiting state.

23. The system of claim 17, wherein the transaction management library implements a call to a non-XA-aware application to participate in the distributed database transaction.

24. The system of claim 17, wherein the transaction management library implements a shared identifiers for multiple application programs that access a same resource manager.

* * * * *